181-198 SR
FIP8110 XR 3,229,429 [redacted]
SEARCH ROOM

Jan. 18, 1966 I. W. CONRAD 3,229,429
SECURE CONFERENCE SYSTEMS
Filed April 27, 1960 3 Sheets-Sheet 1

Ivan W. Conrad
INVENTOR
BY H. L. Godfrey

Ivan W. Conrad
INVENTOR

BY H. L. Godfrey

Ivan W. Conrad
INVENTOR.
BY H. L. Godfrey

United States Patent Office 3,229,429
Patented Jan. 18, 1966

3,229,429

SECURE CONFERENCE SYSTEMS

Ivan Willard Conrad, 810 Crescent Drive,
Alexandria, Va.

Filed Apr. 27, 1960, Ser. No. 25,181
12 Claims. (Cl. 52—2)
(Granted under Title 35, U.S. Code (1952), sec. 266)

The invention described herein may be manufactured and used by or for the Government of the United States for governmental purposes without the payment to me of any royalty thereon in accordance with the provision of 35 U.S.C. 266.

The present invention relates generally to secure conference areas and has for its principal purpose to provide a conference area in which conversations may be carried on without fear of compromise resulting from clandestine listening devices. By conference area is meant an area in which one or more individuals may carry out, by voice or otherwise, the activity of initiating, transmitting, or receiving intelligence. A further object is to provide for such a conference area an enclosure which can be quickly and easily checked to determine that no clandestine listening devices are installed within the enclosing walls, ceiling, floor or other enclosure structure.

Essentially, the invention contemplates achieving such tamperproofing through the use of material capable of easy and complete inspection (such as readily demountable opaque material or transparent or translucent material) for the construction within an "outer" room of the usual opaque materials, of a second "inner" enclosure capable of ready and thorough inspection against tampering such as that required for the installation and use of clandestine eavesdropping devices; that is, a "room within a room" separated from the outer room by an air space substantially completely surrounding the inner room except for occasional support members made of transparent materials.

When made of transparent materials, such a transparent inner room has the immediate, outstanding merit that it can be quickly and positively checked at any time by direct visual inspection to determine that the inner structure is completely free of clandestine listening devices. While it is feasible to provide an inner enclosure structure of sufficient sound attenuation to reduce conversational sounds to inaudibility outside the inner enclosure, a preferred approach is to provide only normal attenuation in the structure comprising the inner enclosure, and to flood the air space between the inner and outer room structures with a masking level of sound or noise which will completely mask any residual conversational sounds which may penetrate the inner enclosure walls and otherwise be detected by clandestine listening devices concealed within the opaque walls of the conventional outer room.

In addition, it is also preferred to place between the inner and the outer room an electrically conducting shield to provide a barrier against illumination of the inner room from the outside by electromagnetic radiation.

Another object of the invention is to provide such a secure enclosure which may be readily assembled or disassembled and moved from one location to another for use. With the foregoinng objects in view, the invention consists of the novel combinations and arrangements of features as will be hereinafter more fully described, illustrated in the accompanying drawings, and defined in the appended claims.

In the accompanying drawings wherein are illustrated different, nonlimiting, practical embodiments of the invention, and wherein like characters of reference denote corresponding parts in related views.

Figure 1:
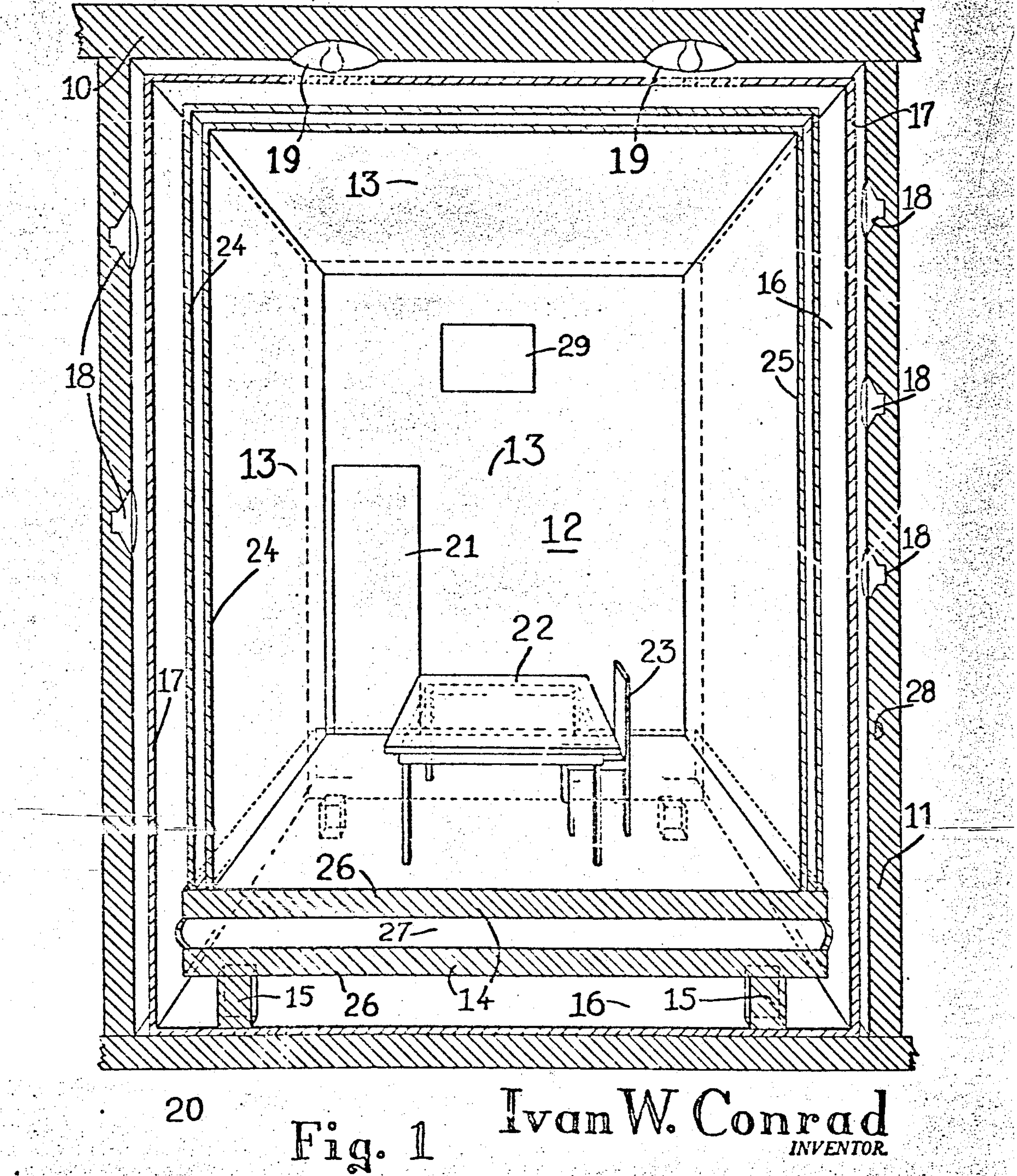
FIG. 1 illustrates diagrammatically a preferred embodiment of the invention utilizing transparent materials for the inner enclosure structure.

Referring to detail to FIG. 1 there is shown generally in cross section at 10, a relatively conventional room structure, the walls of which are designated as 11. The transparent inner room is designated generally by 12, comprising a transparent wall and ceiling structure 13, and a transparent floor structure 14. Transparent pillars 15 serve to provide an air space 16 between the floor 20 of conventional room 10 and transparent floor 14. Air space 16 extends up around walls 13 completely surrounding transparent room 12 except for the presence of pillars 15, and is of such thickness as to permit ready physical access to any part of the exterior surface of transparent room 12 for detailed physical and visual examination. Within air space 16 and substantially completely surrounding room 12 on all sides is electrically conducting radiation barrier 17. Barrier 17 may be completely opaque or may consist of fine mesh perforation or screen construction. Situated at several locations opening into air space 16 from conventional room 10 are masking-sound sources 18, the purpose of which is to flood space 16 with a relatively uniform, high sound level. The sources 18 are of conventional design, and simply serve to propagate audible acoustic energy either in the form of sound or noise in the air space 16. The sources 18 may, for example, as pictured diagrammatically in FIG. 1 be conventional loudspeakers driven by electrical energy in the audible frequency range. While almost any form of interfering sound will provide some masking effect on perception of other sounds, the sounds produced by sources 18 normally will be of a type chosen to provide the maximum masking effectiveness on sounds of the type originating within inner room 12. Also situated at one or more locations opening into air space 16 are light sources 19 which can illuminate the interior of room 12 through suitable mesh openings in radiation shield 17 and through transparent ceiling 13. Thus there is no need for any wires leading across air space 16 to room 12. The absence of any such wires is an obvious advantage in the tamperproofing, since such wires would otherwise provide a convenient means of egress for any eavesdropping signal from the inner room. A transparent door 21 is provided at a suitable location in wall 13 and when closed provides sound attenuation comparable to that afforded by walls and ceiling 13. No other opening in room 12 is absolutely essential, since oxygen depletion can be taken care of by placing oxygen tanks in room 12, and since temperature can be controlled through the control of the air temperature in space 16. However, ventilation opening 29 may be provided if fitted with suitable sound traps to avoid leakage of unattenuated sound directly into air space 16. It is further contemplated that furniture, such as table 22 and chair 23 used within the room 12 will also be constructed of transparent material in order to insure that no clandestine listening devices may be concealed within this furniture.

Wall 13 may be constructed of a single thickness 24 of transparent material; however, in order to achieve a high degree of sound attenuation, wall 13 is preferably constructed of 2 or more separate sheets 24 separated by a space 25.

This space 25 may be merely a dead air space; or it may be evacuated; or alternatively, it may be filled with a transparent viscous material having a high damping effect, or with a cellular material such as plastic foam. Floor 14 may consist of a single relatively massive transparent block 26 with customary structural design to provide maximum strength with minimum weight; or alternatively, it may consist of two or more such blocks 26 separated by a space 27 which may be evacuated or filled with sound attenuating material as set forth above for wall space 25.

It will now be apparent to those skilled in the art that in a room 12 of the type shown and described in connection with FIGURE 1 a conference may be held under conditions of comfort, illumination, and freedom of movement substantially equal or better than those present in an ordinary conference room. Complete assurance that no concealed listening devices of either the wired or wireless type are present within the furniture or room structure is possible by mere visual inspection, since these structures are all transparent to visible light. With respect to any residual conversation sound level which may exist in air space 16, after passing through the attenuating structure of room 12, masking sound sources 18 provide an interfering mask of sound which renders detection of the original conversation by a concealed listening device such as microphone 28 totally impossible, because of the nature and much higher intensity of the sound from sources 18. It will be recognized that this masking sound energy would also interfere with conversations occurring within the inner enclosure, were it not for the attenuation suffered by the masking sound in traversing the enclosure structure. Accordingly, it will be seen that the sound attenuation afforded by the inner enclosure structure cannot be arbitrarily small or merely incidental to just any arbitrary enclosure structure, but rather the attenuation afforded by the inner enclosure must be substantial; otherwise, a level of noise sufficient to mask any residual conversation escaping from the enclosure would simultaneously present intolerable interference masking to conversation sounds within the inner enclosure. It is for this reason that wall 13 is preferably constructed of 2 or more separate sheets in order to achieve a high degree of sound attenuation as stated earlier in connection with the description of wall 13. Since the acoustic energy attenuation afforded by the inner enclosure structure thus cannot be arbitrarily small but must be rather high, I define the term "substantially soundproof" as meaning "offering a high degree of attenuation to the transmission of acoustic energy," and I use this term to designate the highly attenuating acoustic characteristic of the inner enclosure structure. More specifically, I use it to designate a degree of acoustic transmission attenuation which, when operating on conference-related sounds penetrating outwardly through the inner enclosure, will reduce such conference-related sounds to a level which can be readily and totally masked by a selected external level of masking acoustic energy; and which, when operating on this same selected level of masking energy penetrating inwardly through the inner enclosure, will reduce the residual masking energy entering inside the inner enclosure to a noninterfering level. It will further be apparent to those skilled in the art that the electrically conducting shield 17 surrounding enclosure 12 will effectively prevent irradiation of room 12 with electromagnetic radiation otherwise capable of penetrating conventional wall structure 11. Thus as a result of the system shown, maximum security is assured to conferences held within the transparent enclosure 12.

Figure 2:
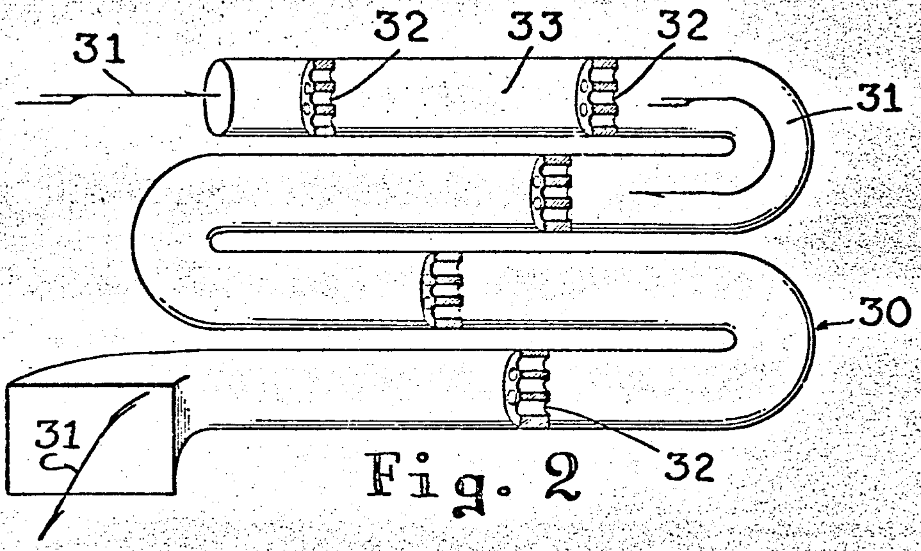
FIG. 2 illustrates a suitable ventilating sound trap made of transparent materials for use with the enclosure of FIG. 1.

Referring now to FIGURE 2 there is shown a transparent sound trap 30 of a type suitable for use in ventilating the room 12 of FIGURE 1. Essentially this sound trap consists of a relatively long air path, the flow of air being designated diagrammatically by arrows 31. The ventilating air traversing the trap is forced to pass through a series of acoustic 32 and reservoirs 33. Sufficient path length and filtering is provided to afford voice frequency attenuation comparable to that afforded by walls 13 of FIGURE 1.

Figure 3:
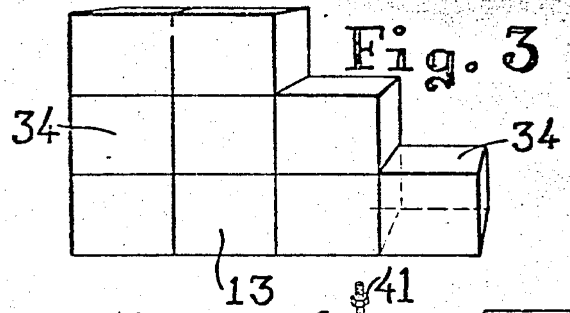
FIG. 3 illustrates the use of transparent subunit building construction for portions of the inner enclosure, the subunits being bonded together with transparent solvents or adhesives.

The embodiment of FIGURE 1 shows essentially continuous transparent areas such as might be cast in place, for example, from a suitable plastic such as a modified styrene for permanent installation; however, it is, of course, readily possible to make the transparent enclosure from smaller subunits or building blocks, which in turn may be cemented together with suitable transparent solvents or cement to form the desired structure, as for example, Plexiglas subunits bonded together with methylene dichloride. Such subunits 34 could be formed in the shape of any of the well known building blocks such as hollow tile, bricks, "cement blocks," et cetera, to form a transparent wall 13 as shown diagrammatically in FIGURE 3.

Figure 4:
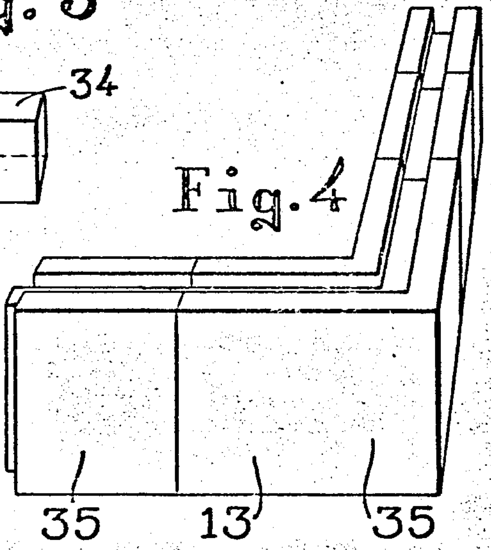
FIG. 4 illustrates an interlocking type of transparent material construction, capable of ready disassembly and reassembly.

Alternatively, the walls 13 could be constructed from transparent prefabricated subunits 35 of a demountable nature, as shown in FIGURE 4, where the subunits are held together by interlocking tongue-and-groove construction, or any similar prefabricated structure capable of ready assembly and disassembly.

While the embodiments described in connection with FIGURES 1 through 4 contemplate the use of transparent building materials for the "inner room," it will be apparent to those skilled in the art that as a matter of construction convenience, the inner room may be made in part or even in whole of opaque, demountable materials; such use of opaque, demountable material will, however, introduce a corresponding decrease in ease of checking for concealed listening devices and, to some extent, a corresponding loss of assurance of safety since the opaque portions will have to permit complete disassembly to afford a thorough security check for the presence of such concealed listening devices.

Figure 5:
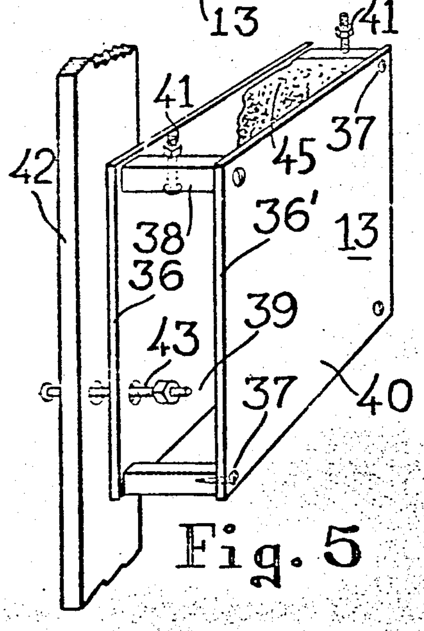
FIG. 5 illustrates a representative inner enclosure panel constructed partially of opaque material, the opaque portions being readily removable for inspection.

Referring now to FIGURE 5, there is shown for example a representative inner room panel 40 made in part of opaque materials and capable of ready disassembly for security inspection. Sheet materials 36 and 36' may be chosen of an opaque material, such as tempered Masonite, and held by screws 37 to transparent spacers 38, forming a space 39 between sheets 36 and 36'. The entire panel 40 may be fastened to other similar panels by fasteners 41 to form the floor, walls, and ceiling of a complete inner enclosure similar to that shown at 12 in FIGURE 1; alternatively, a plurality of panels 40 may be fastened to a skeleton support structure 42 by fasteners 43 to form a suitable inner room structure. In either event, the outer sheet 36' may be readily removed without otherwise dismantling the enclosure, in order to inspect visually the interior of the wall construction for security purposes. Space 39 may be filled with any desired sound attenuating material 45 such as cork or other readily removable material, or space 39 may be left as a dead air space. Alternatively, it will be recognized, that the sheets 36 and 36' may be chosen of transparent material, and the supporting structures 38 and 42 may be of thin opaque structural material such as metals; in such case, certain of the fasteners 37 may be replaced, if desired, by permanent adhesive.

Figure 6:
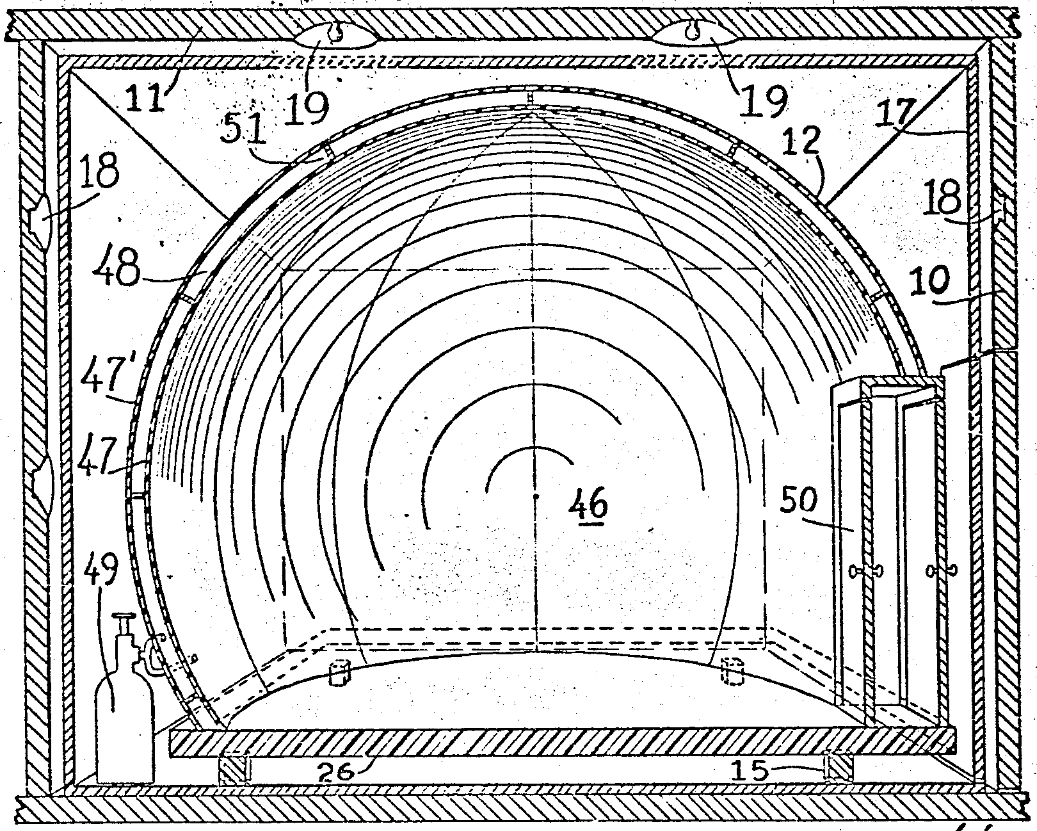
FIG. 6 illustrates an inflatable transparent plastic enclosure suitable for use as a soundproof inner room.

Referring next to FIGURE 6 there is shown an inflatable transparent plastic enclosure 46 suitable for use as a substantially soundproof inner room 12 within a conventional room 10. A radiation barrier 17, lights 19, and masking sound sources 18 are provided as described in connection with the embodiment of FIGURE 1. Enclosure 46 may consist of a single layer of transparent flexible plastic 47 or may alternatively consist of two or more such layers, as shown at 47 and 47', separated by a space 48. Enclosure 46 maintains its extended shape through air pressure fed into its interior and into any intervening air spaces 48 by any suitable means such as air pressure reservoir 49. A double door air lock shown at 50 provides suitable entry and egress while maintaining sufficient air pressure within enclosure 46 to maintain 46 in an extended condition. Tensile spacers 51 may be provided to maintain approximately uniform spacing between layers 47 and 47'. Floor 26 and pillars 15 are provided of transparent material as described for the comparable embodiment of FIGURE 1. Suitable flexible plastics for such an inflatable enclosure are currently commercially available.

Figure 7:
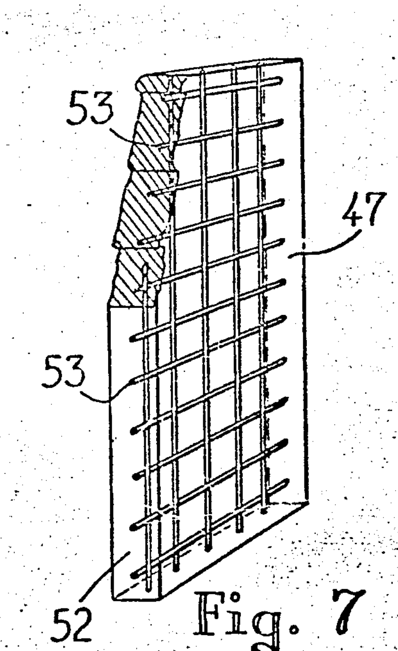
FIG. 7 illustrates a plastic layer construction suitable for use in the embodiment of FIG. 6.

While transparent layer 47 may be of any suitable construction, a preferred construction is shown in FIGURE 7 wherein layer 47 is shown to consist of a flexible plastic matrix 52 formed about a flexible transparent reinforcing mesh fabric 53 (such as a nylon fabric). In this type of construction fabric 53 provides the necessary form-determining tensile stability, permitting plastic matrix 52 to be chosen for maximum sound damping and attenuating characteristics.

Figure 8:
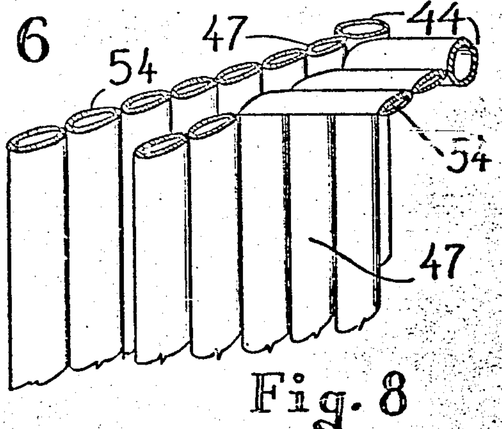
FIG. 8 illustrates a "pneumatic mattress" type of plastic wall construction for the conference area enclosure.

Still a further alternative type of inflatable enclosure structure is shown in FIGURE 8 where flexible transparent layers 47 and 47' are shown to consist of pneumatic "mattress" type of construction, embodying pneumatic cells 54. Pneumatic cellular walls of this type would readily lend themselves to the construction of an inner enclosure having rectangular form factor comparable to that shown in FIGURE 1, since the cell shape and the air pressure within the cells can be chosen to make the walls and ceiling constructed in this manner completely self-supporting, without the necessity for a supporting air pressure differential within the inner room itself. Use of such cellular construction would, therefore, eliminate the need for a source of air pressure within the inner room required in the embodiment of FIGURE 6. Certain of the air cells, for example, may be made larger to serve the function of support "beams," as shown at 44.

While the embodiments discussed so far include radiation barrier 17 together with a surrounding air space 16, it will be apparent to those skilled in the art that the soundproof inner enclosure 12 may consist of a layer of transparent sound-absorbing plastic applied directly to the inner surface of a conventional conference room 10 without the necessity for a radiation shield 17 or for a surrounding air space 16. Such a transparent inner enclosure would rely entirely upon its sound-absorbing properties to render concealed listening devices inoperative in the surrounding conventional opaque structure, and would rely upon its transparency for visual inspection to determine that no microphones were close to the inner surface of the transparent enclosure.

Suitable transparent plastic materials for casting transparent structures in place or for forming any of the inner enclosure structures described in FIGURES 1 through 8 above are readily available on the commercial market. For example, American Cyanamid products known as Laminac #4110 and Laminac #4134 may be used for "casting-in-place" applications. Lucite manufactured by Du Pont and Plexiglas by Rohm and Haas are suitable for prefabricated panels and building blocks. The polyethylene product Petrothene of U.S. Industrial Chemicals Co., and the polypropylene Escon of Enjay Company, Inc., are suitable for the flexible, inflatable applications described. A detailed reference listing of commercially available plastics and manufacturers may be found, for example, in the 1960 Encyclopedia issue of the publication "Modern Plastics" of the Plastics Catalog Corporation, New York, New York.

While only certain specific embodiments of the invention have been illustrated and described to convey the general concept of the invention, it is to be understood that the same is readily capable of various other embodiments within its spirit and scope as defined in the appended claims.

What I claim as new and desired to secure by Letters Patent of the United States is as follows:

1. A secure conference system comprising a substantially sound-proof transparent inner enclosure defining and completely surrounding a conference area, said inner enclosure being constructed at least on all exposed surfaces of material impervious to clandestine alteration, an electromagnetic radiation barrier substantially completely surrounding said inner enclosure, substantially soundproof means impervious to clandestine alteration for providing oxygen and illumination to said conference area, substantially soundproof means impervious to clandestine alteration providing entry to and egress from said conference area, outer wall means defining and air space of noncritical thickness substantially completely surrounding said inner enclosure, substantially soundproof means impervious to clandestine alteration for controlling the temperature of said conference area, and means for flooding said surrounding air space with a high level of conference-masking sound whereby any residual conference-related sound escaping from said conference area through said inner enclosure is reduced to unintelligibility outside said enclosure by said masking sound.

2. A secure conference system as set forth in claim 1 in which the floor of said inner enclosure is mounted on transparent pillars constructed at least on all exposed surfaces of material impervious to clandestine alteration and in which there is no opaque member whatever bridging said air space to said inner enclosure, whereby the unaltered secure condition of said enclosure and the unaltered secure condition of said respective means for illuminating, furnishing oxygen, controlling temperature, and providing entry and egress can be verified by visual inspection; said means for illuminating including at least one light source located outside said transparent inner enclosure and transmitting light through said transparent enclosure into the interior of said enclosure; said means for furnishing oxygen including at least one transparent duct conducting said oxygen into the interior of said enclosure and made at least on all exposed surfaces of material impervious to clandestine alteration; said means for controlling temperature including at least one transparent duct conducting air of any desired temperature into the interior of said enclosure and made at least on all exposed surfaces of material impervious to clandestine alteration; and said means providing entry and egress including a conventional door located in said outer wall means, and a transparent door located in the perimeter of said inner enclosure in communication with said conventional door and constructed at least on all exposed surfaces of material impervious to clandestine alteration.

3. A secure conference system as set forth in claim 1 in which said inner enclosure is constructed at least in part of readily removable and replaceable portions which at least on all exterior surfaces thereof are made of material impervious to clandestine alteration whereby said removable portions may be dismantled for security inspection purposes.

4. A secure conference system comprising acoustic barrier means defining a substantially soundproof inner enclosure, said inner enclosure being constructed at least on all exposed surfaces of material impervious to clandestine alteration, an electromagnetic radiation shield substantially completely surrounding said inner enclosure, outer wall means defining an acoustic energy conducting layer of noncritical thickness substantially completely surrounding said inner enclosure, and means for flooding said conducting layer with a high level of masking acoustic energy, whereby any residual acoustic energy escaping from within said inner enclosure is rendered completely unintelligible outside said inner enclosure by the masking effect of said masking energy.

5. A security system comprising an inner acoustically attenuating and substantially soundproof barrier enclosure defining and completely enclosing a secure working room for conference-related work involving the production of work-related acoustic energy, said inner enclosure being constructed at least on all exposed surfaces of material impervious to clandestine alteration, an electromagnetic radiation barrier substantially completely surrounding said inner enclosure, outer wall means defining an accoustically conducting layer of non-critical thickness substantially completely surrounding said inner enclosure, and means for flooding said conducting layer with masking acoustical energy; said work-related acoustic energy and said masking acoustic energy being so related to each other in intensity and to the attenuation of said acoustic barrier that any work-related acoustic energy penetrating outward through said barrier is attenuated to an unintelligible level outside said enclosure in the presence of said masking acoustic energy, and being further so interrelated that said masking acoustic energy penetrating inwardly through said barrier is attenuated below a work-interfering level inside said workroom.

6. A secure conference system as set forth in claim 5 in which said soundproof inner enclosure includes walls and ceiling made, at least in part, of inflatable flexible material impervious to clandestine alteration, and alteration for supplying air pressure to the interior of at least a portion of said inner enclosure, said walls and ceiling being held in extended form by said air pressure within said enclosure.

7. A secure conference system as set forth in claim 5 in which the said soundproof inner enclosure is made, at least in part, of transparent plastic material impervious to clandestine alteration cast in place and in which said acoustically conducting layer is an integral part of said outer wall means, and further in which said masking acoustic energy is the ambient acoustic energy normally present in said layer resulting from normal environmental sounds and vibrations.

8. A secure conference system as set forth in claim 5 in which the said soundproof inner enclosure is constructed, at least in part, of transparent interlocking prefabricated sections made of material impervious to clandestine alteration.

9. A secure conference system as set forth in claim 5 in which the said soundproof enclosure includes walls and ceiling consisting of at least two separate layers of transparent material impervious to clandestine alteration physically spaced apart from each other and held in such spaced relation by material which is impervious to clandestine alteration.

10. A secure conference system as set forth in claim 5 in which said soundproof enclosure consists at least in part of a plurality of demountable panels made at least on all exposed surfaces of material impervious to clandestine alteration, each such panel including at least two separate layers of transparent material physically spaced apart from each other and mounted in substantially parallel spaced relation on a rigid supporting structure made at least on all exposed surfaces of material impervious to clandestine alteration, and means impervious to clandestine alteration for joining together said plurality of panels to form at least a part of said soundproof enclosure.

11. A secure conference system as set forth in claim 5 in which said soundproof inner enclosure is constructed, at least in part, of individual building blocks made at least on all exposed surfaces of material impervious to clandestine alteration and cemented together with cement impervious to clandestine alteration.

12. A secure conference system as set forth in claim 5 in which said acoustic barrier enclosure includes a transparent covering material impervious to clandestine alteration on all exposed surfaces, whereby any clandestine penetration of said barrier means necessarily involves visibly detectable penetration of said transparent material.

References Cited by the Examiner

UNITED STATES PATENTS

| | | | |
|---|---|---|---|
| 230,228 | 7/1880 | Boyd | 52—506 |
| 721,991 | 3/1903 | Aims | 61—83 |
| 2,043,416 | 6/1936 | Lueg | 181—0.5 X |
| 2,217,394 | 10/1940 | Wengel | 181—0.56 |
| 2,232,779 | 2/1941 | Fletcher | 181—0.56 |
| 2,594,971 | 4/1952 | Moullin | 174—35 X |
| 2,708,774 | 5/1955 | Seelen | 52—616 X |
| 2,742,391 | 4/1956 | Warp | 52—309 X |
| 2,793,245 | 5/1957 | Dunn | 52—63 X |
| 2,823,424 | 2/1958 | Reinhold | 52—36 |
| 2,900,994 | 8/1959 | Igoe | 52—2 |
| 2,910,994 | 11/1959 | Joy | 52—2 |
| 2,915,074 | 12/1959 | Cameto | 52—2 |
| 2,961,478 | 11/1960 | Burns | 52—285 X |

FOREIGN PATENTS

| | | |
|---|---|---|
| 1,076,693 | 4/1954 | France. |

FRANK L. ABBOTT, *Primary Examiner.*

WILLIAM I. MUSHAKE, JACOB L. NACKENOFF, *Examiners.*

C. G. McBRIDE, K. E. PAYNE, *Assistant Examiners.*